US006599189B1

(12) United States Patent
Chateau

(10) Patent No.: US 6,599,189 B1
(45) Date of Patent: Jul. 29, 2003

(54) NUMBERS DRAWING MACHINE

(76) Inventor: Clotaire Raoul Georges Chateau, 8, allee des Sapins, F-94420 Le Plessi Trévise (FR)

( * ) Notice: Subject to any disclaimer, the term of this patent is extended or adjusted under 35 U.S.C. 154(b) by 0 days.

(21) Appl. No.: 09/720,265

(22) PCT Filed: Jul. 10, 1998

(86) PCT No.: PCT/FR98/01498

§ 371 (c)(1), (2), (4) Date: Jan. 10, 2001

(87) PCT Pub. No.: WO00/03360

PCT Pub. Date: Jan. 20, 2000

(51) Int. Cl.$^{7}$ .................................................. A63F 13/00

(52) U.S. Cl. ....................... 463/19; 463/22; 273/144 R; 273/138.2

(58) Field of Search ................................ 463/1, 16–19, 463/22, 2; 273/144 R–144 B

(56) References Cited

U.S. PATENT DOCUMENTS 4,961,578 A 10/1990 Chateau
5,312,103 A 5/1994 Chateau
5,672,109 A * 9/1997 Natanian ..................... 463/22
5,799,940 A * 9/1998 Tripp ..................... 273/144 B

FOREIGN PATENT DOCUMENTS

| | | |
|---|---|---|
| DE | 3306226 | 8/1984 |
| FR | 2379863 | 9/1978 |
| FR | 0348281 | 12/1989 |
| FR | 0557193 | 8/1993 |
| FR | 2762117 | 10/1998 |

OTHER PUBLICATIONS

English Language Abstract of FR2 762 117.
English Language Abstract of DE33 06 226.
English Language Abstract of FR2 379 863.

* cited by examiner

*Primary Examiner*—Mark Sager
*Assistant Examiner*—Aaron Capron
(74) *Attorney, Agent, or Firm*—Greenblum & Bernstein, P.L.C.

(57) ABSTRACT

Machine for conducting a random drawing comprising at least one object randomly displaceable in space. A sensor is adapted to be impacted by the at least one object. At least two electric signals are generated by the machine. At least one of the at least two electric signals is a cyclically generated signal. At least another of the two electric signals is generated when the at least one object impacts the sensor.

16 Claims, 1 Drawing Sheet

NUMBERS DRAWING MACHINE

CROSS-REFERENCE TO RELATED APPLICATIONS

The present application is a National Stage Application of International Application No. PCT/FR98/01498, filed Jul. 10, 1998.

BACKGROUND OF THE INVENTION

1. Field of the Invention

The present invention relates to a machine for drawing numbers, of the type used, for example, for drawing lottery numbers.

2. Discussion of Background Information

European Patent Nos. 0 348 281 and 0 557 193 disclose machines for drawing planar figures or number balls. Such known machines are composed of an enclosure in which numbered balls, for example, are placed and mixed, the draw consisting of extracting a certain number of balls one by one.

These machines are very reliable and the completely random character of the draw is beyond doubt. However, the need to mechanically extract the objects from the mixing enclosure is such that the draw is relatively slow. Similarly, a certain amount of time is necessary to perform a second draw, because the objects to be drawn must be reintroduced into the mixing enclosure, after verifying that all of the objects likely to be drawn are indeed introduced into the enclosure. This requires the presence of a person whose word cannot be questioned, such as a bailiff, for example, before and during the draw.

SUMMARY OF THE INVENTION

The invention provides for a machine for conducting a random drawing comprising at least one object randomly displaceable in space. A sensor is adapted to be impacted by the at least one object. At least two electric signals are generated by the machine. At least one of the at least two electric signals is a cyclically generated signal. At least another of the two electric signals is generated when the at least one object impacts the sensor.

The machine may further comprise at least one display, wherein a coincidence of the at least two signals is used for maintaining in a predetermined state of the at least one display. The at least one display may be of an object to be drawn. The at least one display may comprise at least one light source adapted to be switched on or switched off according to a predefined rhythm. The at least one display may comprise a plurality of displays. Each of the displays may comprise at least one light source adapted to be switched on or switched off according to a predefined rhythm.

The machine may further comprise a transparent enclosure for containing the at least one object, and a current of air for agitating the at least one object within the transparent enclosure. The at least one object may be a ball and a random signal may be generated when the ball agitated by the current of air impacts the sensor.

The machine may further comprise a clock, a counter connected to the clock, and a decoder connected to the counter. At least one output of the decoder may be communicated to the at least one display. At least one output of the decoder may be communicated to the at least one display via one of a memory circuit and an OR-circuit.

The machine may further comprise at least one bus for allowing a signal emitted by the sensor to be input to at least one memory circuit. The machine may further comprise at least one bus for allowing a signal emitted by the sensor to be input into a validation input of at least one memory circuit, wherein the signal emitted by the sensor is efficient only during a rising edge. The machine may further comprise a system for remotely transmitting a result of the drawing.

The invention also provides for a machine for conducting a random drawing comprising at least one display, a transparent enclosure defining a space, at least one object randomly displaceable in the space, a sensor adapted to be impacted by the at least one object, a mechanism for agitating the at least one object, a clock connected to a counter, the counter communicating with at least one decoder, wherein the sensor is adapted to generate a random signal by impact between the at least one object and the sensor.

The invention further provides for a machine for conducting a random drawing comprising a plurality of displays. A transparent enclosure is provided for defining a space. A plurality of objects are randomly displaceable in the space. A sensor is adapted to be impacted by the objects. A mechanism for agitating the objects is included. A clock is connected to a counter. The counter communicates with at least one decoder. The sensor is adapted to generate a random signal by impact between the at least one object and the sensor. Each display is adapted to be switched on and off according to at least one of a defined and an adjustable rhythm. At least one of the displays is adapted to remain switched on when the switching on of one of the displays coincides with the random signal.

The machine according to the present invention overcomes these drawbacks, and is characterized in that the draw is the result of the coincidence, in time, of two electric signals, one of which is cyclically generated, whereas the other is generated during impact with a sensor of an object whose displacement in space is completely random, the coincidence phenomenon having the effect of maintaining in an excited state a display which materializes the object to be drawn.

According to one embodiment of the present invention, the machine comprises a plurality of displays each of which is in the form of a box enclosing a light source adapted to be switched on or switched off according to a predefined rhythm.

If a randomly generated signal is applied to one of the displays, when the display is turned on, the corresponding light source remains switched on and, if the display represents the number "20," this number is drawn.

To create the random signal, one can use a device similar to that described in the European Patent No. 0 348 281, i.e., one which comprises an enclosure in which balls are agitated by a current of air, the device being completed by a sensor adapted to emit a signal when it is hit by a ball.

Other devices can be used for the same purpose. Thus, a device of the "Pachinko" type can be used, in which a heavy ball falls through obstacles that modify its trajectory.

The machine according to the present invention can used in implementing a game of skills. Thus, a device can be designed, according to which a player can initiate a signal to be emitted by a sensor in order to attempt to make his action coincide with the lighting cycle of a display materializing a prize to win.

BRIEF DESCRIPTION OF THE DRAWINGS

The present invention will be better understood from the description that follows, with reference to the drawings, which are provided by way of non-limiting examples of embodiments of the present invention and wherein.

DETAILED DESCRIPTION OF THE PRESENT INVENTION

With reference to the drawings, and according to one embodiment of the present invention, the machine comprises a plurality of displays 1 whose state is adapted to change and each of which represents a symbol, a number, etc.

Each display is biased one after the other according to a defined and adjustable rhythm. When the state of a display changes and, at this moment, an originally random control signal is applied thereto, it remains in this state.

Thus, if each display comprises a light source, the spectators see the boxes being switched on and off one after the other until an originally random control signal coincides with the switching on of one of the displays. At this moment, the corresponding display remains switched on and, for example, represents a number. In this case, the draw is completed when a certain number of displays have been switched on.

Figure 1:
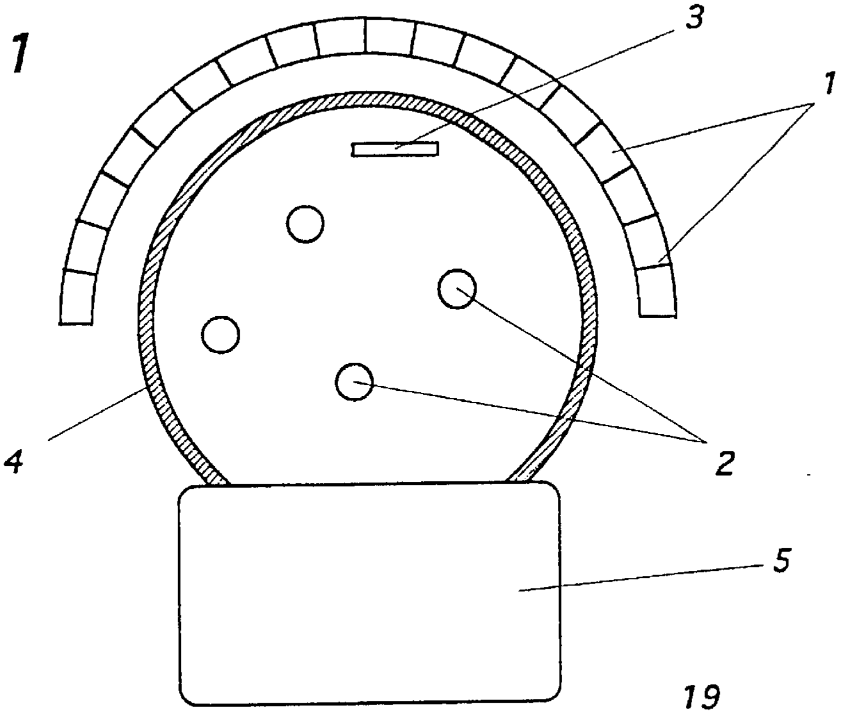
FIG. 1 shows the appearance of the machine for drawing.

According to one embodiment of the present invention, the random signal is generated by the collision of at least one ball 2 with sensor 3. The balls 2 and the sensor 3 are arranged in a transparent enclosure 4 comprising, at its lower portion, a mechanism 5 for agitating the balls 2. Preferably, and as shown in FIG. 1, the displays 1 are arranged along an arc of a circle surrounding an enclosure 4. The arc of the circle can extend over 360°.

Figure 2:
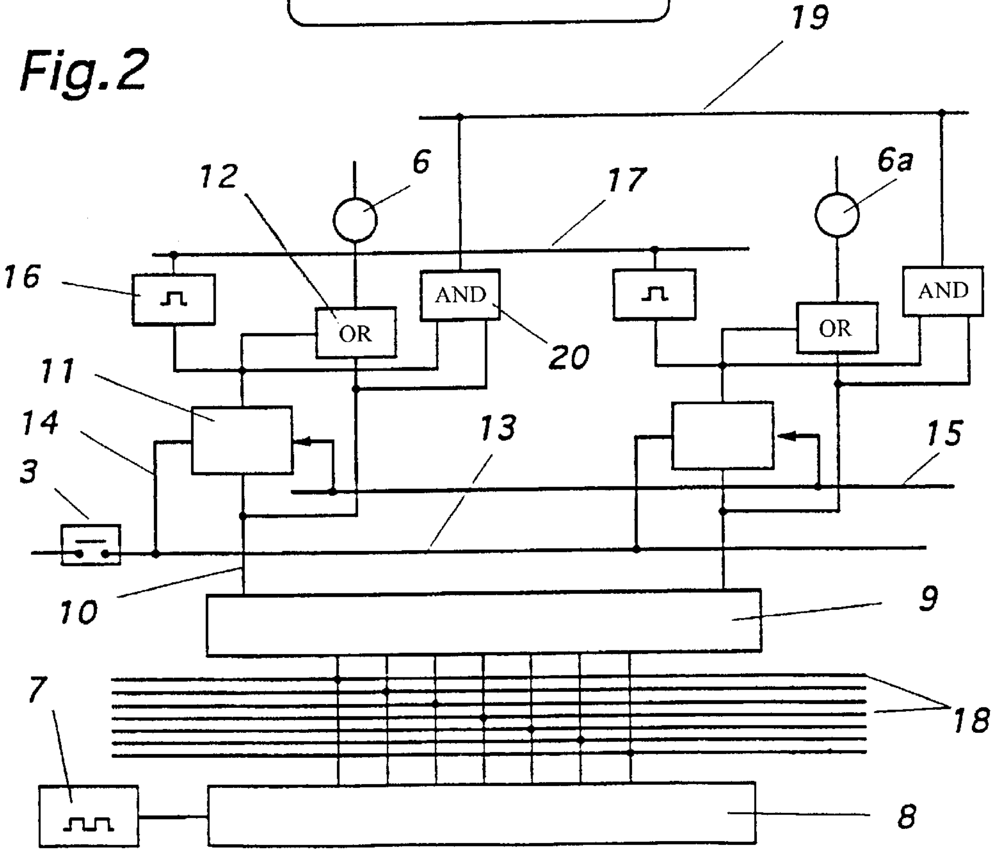
FIG. 2 shows a diagram in order to explain the functioning of the machine.

Referring to FIG. 2, reference numeral 6 schematically defines the light sources of displays 1.

To cyclically switch on and switch off sources 6, clock 7 connected to counter 8 and decoder 9 is used. The decoder 9 has as many outputs 10 as the device has displays 1. Each output 10 is connected to the corresponding lamp through memory 11 and OR-circuit 12 on which the output of the corresponding memory converges.

Sensor 3, which behaves like a switch, makes it possible to apply, via bus 13, a control signal at validation input 14 of all the memories when it is hit by ball 2, for example.

When the balls 2 are not agitated, the sensor 3 cannot be excited, and the light sources 6 are switched on for a certain time, then are switched off after one another, the time for switching on and off depending only on the setting of the clock 7. Preferably, the frequency of change in the state of the displays 1 is sufficiently high so that the eye of the spectator cannot memorize the position of the excited display.

When the balls 2 are agitated, the sensor 3 is excited as soon as it is hit by a ball. Such an event is completely unpredictable.

At this moment, a control signal is present at the validation input of all the memories, however, only the memory that finds the signal at its input (input of the decoder 9) is affected and, via its output, controls the change of state of the corresponding display. In the example shown, the light source connected to the aforementioned memory therefore remains switched on and, by this state, materializes the drawing of a number, for example.

The originally random signal that is applied to bus 13 is efficient only on a rising edge of the signal. When the rising edge has been recorded by a memory, the latter is maintained, and a new change in the state of the corresponding display is not possible.

Upon completion of the draw, a canceling signal is sent to the memories by bus 15.

When the output signal of a memory is being established, circuit 16 sends a fleeting information, via bus 17, to a pulse counter (not shown). Each pulse therefore corresponds to a display that has changed its state and that display maintains that state to the drawing of a number or object. When the number of numbers or objects to be drawn is reached, the machine is stopped. The stopping of the machine is within the skill of the art.

The machine that has just been described makes it possible to perform a draw at a predetermined location, but in certain cases, it is necessary to remotely transmit this information to a location, in tobacco shops, for example, where it can be checked by the public.

According to the present invention, a mechanism is provided for remotely transmitting the result of the drawing.

To this end, counter 8 is connected by any appropriate transmitting mechanism to local decoders (not shown but similar to decoder 9) via buses 18. Each local decoder restores the information which the decoder receives when it is biased by an external signal.

The aforementioned external signal comes from bus 19 to which is connected the output of AND-circuit 20, one input of which receives the input signal of memory 11, and the other input receives the output signal of the memory.

If two signals are present at the same time at the input of circuit 20, it means that the corresponding light source 6 is switched on permanently, and a signal is sent to the local display by bus 19. This information has the effect of locally validating the information that is present, at the same time, on bus 18. For example, if lamp 6*a* corresponding to number "18," in the example shown, is switched on permanently, all of the local displays show the same information.

The present invention also provides the implementation of a control mechanism. Such a mechanism can reside in a video camera that films the result of the drawing at the central location and returns the information to local locations, or vise versa, for comparison.

What is claimed is:

1. A machine for conducting a random drawing comprising:

at least one object randomly displaceable in space;

a sensor adapted to be impacted by the at least one object;

at least two electric signals being generated by the machine;

at least one of the at least two electric signals being a cyclically generated signal; and at least another of the two electric signals being generated when the at least one object is impacts the sensor wherein a coincidence of the at least two signals is used for maintaining the at least one display in a predetermined state.

2. The machine of claim 1, wherein the at least one display is of an object to be drawn.

3. The machine of claim 1, wherein the at least one display comprises at least one light source adapted to be switched on or switched off according to a predefined rhythm.

4. The machine of claim 1, wherein the at least one display comprises a plurality of displays.

5. The machine of claim 4, wherein each of the displays comprises at least one light source adapted to be switched on or switched off according to a predefined rhythm.

6. The machine of claim 1, further comprising:

a transparent enclosure for containing the at least one object; and a current of air for agitating the at least one object within the transparent enclosure.

7. The machine of claim 6, wherein the at least one object is a ball and wherein a random signal is generated when the ball agitated by the current of air impacts the sensor.

8. The machine of claim 1, further comprising:

a clock;

a counter connected to the clock; and a decoder connected to the counter.

9. The machine of claim 8, wherein at least one output of the decoder is communicated to at least one display.

10. The machine of claim 8, wherein at least one output of the decoder is communicated to at least one display via one of a memory circuit and an OR-circuit.

11. The machine of claim 8, further comprising at least one bus for allowing a signal emitted by the sensor to be input to at least one memory circuit.

12. The machine of claim 8, further comprising at least one bus for allowing a signal emitted by the sensor to be input into a validation input of at least one memory circuit, wherein the signal emitted by the sensor is efficient only during a rising edge.

13. The machine of claim 7, further comprising a system for remotely transmitting a result of the drawing.

14. A machine for conducting a random drawing comprising:

at least one display;

a transparent enclosure defining a space;

at least one object randomly displaceable in the space;

a sensor adapted to be impacted by the at least one object;

a mechanism for agitating the at least one object;

a clock connected to a counter;

the counter communicating with at least one decoder, wherein the sensor is adapted to generate a random signal by impact between the at least one object and the sensor wherein at least one output of the decoder is communicated to the at least one display and the coincidence of the random signal and the at least one output produce a random outcome.

15. A machine for conducting a random drawing comprising:

a plurality of displays;

a transparent enclosure defining a space;

a plurality of objects randomly displaceable in the space;

a sensor adapted to be impacted by the objects;

a mechanism for agitating the objects;

a clock connected to a counter;

the counter communicating with at least one decoder, the sensor being adapted to generate a random signal by impact between the at least one object and the sensor;

each display being adapted to be switched on and off according to at least one of a defined and an adjustable rhythm;

wherein at least one of the displays is adapted to remain switched on when the switching on of one of the displays coincides with the random signal.

16. A machine for conducting a random drawing comprising:

at least one object randomly displaceable in space;

an impact sensor which is impacted by the at least one object;

first and second electric signals;

the first electric signal being a cyclically generated signal;

the second electric signal being generated when the at least one object impacts the impact sensor;

at least one display which can change states;

one state of the at least one display being caused by the first electrical signal; and another state of the at least one display being caused by both the first and second electrical signals coinciding.

* * * * *